United States Patent Office 3,787,403
Patented Jan. 22, 1974

3,787,403
AMINO-DERIVATIVES OF 1,2-BENZOTHIAZINE DIOXIDES
Chris Royce Rasmussen, Ambler, Pa., assignor to McNeil Laboratories, Inc.
No Drawing. Filed Oct. 2, 1972, Ser. No. 294,122
Int. Cl. C07d 93/02
U.S. Cl. 260—243 R    7 Claims

ABSTRACT OF THE DISCLOSURE

The compounds herein are 1,2,3,4-tetrahydro-11-hydroxypyrazino[1,2-b]-1,2-benzothiazin-1(2H)-one 6,6-dioxides, useful for their ultra-violet absorption and pharmacological properties.

DESCRIPTION OF THE INVENTION

This invention relates to novel 1,2,3,4-tetrahydro-11-hydroxypyrazino[1,2-b]-1,2-benzothiazin-1(2H)-one 6,6-dioxides and, more particularly, to those having the following formula

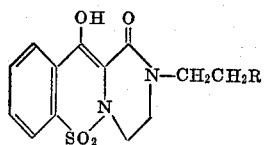

(I)

wherein R is a member selected from the group consisting of 4-loweralkylpiperazinyl, anilino, morpholino, diloweralkylamino, and piperidino. As used herein, "loweralkyl" means a straight or branched chain saturated aliphatic hydrocarbon containing from 1 to about 5 carbon atoms such as, for example, methyl, ethyl, propyl, isopropyl, butyl, and the like.

The compounds of Formula I are made by reacting (1,2,3,4-tetrahydro - 11 - hydroxy-1-oxopyrazino[1,2-b]-1,2-benzothiazin-2-yl)ethyl methane sulfonate 6,6-dioxide (II) which is disclosed in my copending application Ser. No. 294,126 entitled "Novel 1,2-benzothiazine dioxides and Precursors Thereof," filed on the same date as the instant application, with a 1–2 molar excess of an appropriate amine, RH, in which R is as previously defined. The reaction is conducted in a suitable organic solvent such as, for example, an ether, e.g., ethyl ether, dioxane, tetrahydrofuran, and the like; a lower alkanol, e.g., ethanol, isopropanol, butanol, and the like; dimethylsulfoxide; dimethylformamide; and the like. Elevated temperatures may be employed to enhance the rate of reaction. The reaction may be illustrated by the following:

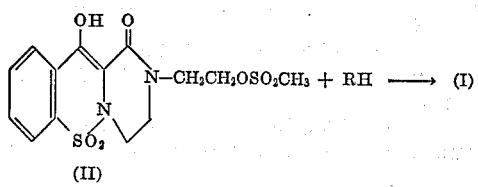

A second method of preparing the compounds of Formula I is by reacting a slight molar excess of an appropriate amine (RH) with 2,3,5,6-tetrahydro-13H-oxazolo[2′,3′:3,4]pyrazino[1,2-b]-1,2-benzothiazin - 13 - (2H)-one 8,8-dioxide (III), also described in my previously mentioned copending application Ser. No. 294,126. This reaction is conducted in a suitable organic solvent as described above and elevated temperatures may be employed to enhance the rate of reaction. The reaction may be illustrated by the following:

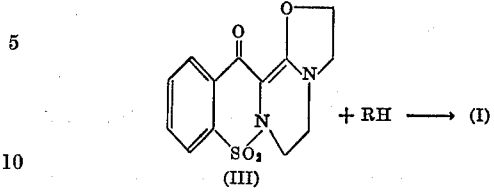

The compounds of Formula I absorb ultra-violet (U.V.) light above 300 nm. and are useful as U.V. screening materials as well as for their pharmacological properties. Table I indicates the U.V. absorption of representative compounds embraced within Formula I.

TABLE I

| R | $\epsilon_{max.}$ | $\lambda_{max.}$, nm. |
|---|---|---|
| −N⟨ ⟩N−CH₃ | 11,200 | 343 |
| −NH−⟨ ⟩ | 12,400 | 347 |
| −N⟨ ⟩O | 10,800 | 343 |
| −N(CH₃)₂ | 8,700 | 343 |
| −N⟨ ⟩ | 12,100 | 342 |

Because of their general solubility in organic materials, the compounds of Formula I may be used as U.V.-absorbers in plastics and resins such as, for example, polystyrene, polyethylene, polypropylene, polyacrylics (e.g., methacrylate resins, polyacrylamides, polyacrylonitrile fibers, etc.), polyamide (e.g., nylon) fibers, and polyester fibers. The inclusion of about 0.01–5.0 percent of the absorber, based on the polymer weight, is usually sufficient to render protection against U.V. light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of the polymer into fibers, etc.

These compounds are also useful for their pharmacological properties. For example, when R=anilino or morpholino, a dose of about 100 mg./kg. body weight i.p. produces ataxia in the mouse, which is indicative of central nervous system depressant activity. Furthermore, when R=piperidino, an oral dose of about 100 mg./kg. body weight is observed to produce 30% inhibition in the conventional kaolin-induced rat paw edema assay, which indicates anti-inflammatory activity.

The following examples are intended to illustrate, but not to limit, the scope of the present invention.

EXAMPLE I 1,2,3,4-tetrahydro-11-hydroxy-2-[2-(4-methyl - 1 - piperazinyl)ethyl]pyrazino[1,2 - b] - 1,2 - benzothiazin-1(2H)-one 6,6-dioxide To a stirred solution of 10.38 g. (0.132 mole) of N-methylpiperizine in 75 ml. of dimethylformamide is added 20 g. (0.051 mole) of (1,2,3,4-tetra-hydro-11-hydroxy-1-oxopyrazino[1,2-b]-1,2-benzothiazin-2-yl)ethyl methanesulfonate 6,6-dioxide. After the mixture has been heated on a steam bath for 2 hours, the solvent is removed in vacuo and water is added to the residue. The resulting crude product (M.P. 163–165° C.) is collected and recrystallized from acetone-water yielding the pure product, 1,2,3,4-tetrahydro-11-hydroxy-2-[2-(4-methyl-1-piperizinyl)ethyl]pyrazino[1,2 - b] - 1,2 - benzothiazin-1(2H)-one 6,6-dioxide, M.P. 165–166° C.

*Analysis.*—Calcd. for $C_{18}H_{24}N_4O_4S$ (percent): C, 55.08; H, 6.16; N, 14.28. Found (percent): C, 55.18; H, 6.04; N, 14.41.

EXAMPLE II

2 - (2 - anilinoethyl) - 1,2,3,4 - tetrahydro - 11 - hydroxypyrazino[1,2 - b] - 1,2 - benzothiazin - 1(2H) - one 6,6-dioxide To a stirred slurry of 7.77 g. (0.02 mole) of (1,2,3,4-tetrahydro - 11 - hydroxy - 1 - oxopyrazino[1,2-b]-1,2-benzothiazin-2-yl)ethyl methanesulfonate 6,6-dioxide in 8 ml. of dry dimethylformamide is added 5.58 g. (0.06 mole) of aniline, followed by a rinse of dry dimethylformamide. The reaction mixture is stirred at ambient temperatures for 3 hours and is then heated on a steam bath for about 15 hours. After the heating is finished, the excess dimethylformamide is removed in vacuo, and the brown, oily residue is triturated with water. Crystallization of the product is caused by decanting the water and adding a slight amount of acetone to the remaining residue. Further crystallization is stimulated by trituration with ethyl ether after removal of the initial product, yielding a crude tan product, M.P. 140–142° C. Recrystallization from acetone-ethyl ether yields the pure product, 2 - (2 - anilinoethyl) - 1,2,3,4 - tetrahydro - 11-hydroxypyrazino[1,2 - b] - 1,2, - benzothiazin - 1(2H)-one 6,6-dioxide, M.P. 143–144° C.

*Analysis.*—Calcd. for $C_{19}H_{19}N_3O_4S$ (percent): C, 59.21, H, 4.97; N, 10.90. Found (percent): C, 59.37; H, 4.81; N, 10.73.

EXAMPLE III 1,2,3,4 - tetrahydro - 11 - hydroxy - 2 - (2 - morpholinoethyl)pyrazino[1,2 - b] - 1,2 - benzothiazin - 1(2H)- one 6,6-dioxide The procedure of Example I is reepated, except that an equivalent amount of morpholine is substituted for the N-methylpiperizine used therein, yielding the desired product, 1,2,3,4 - tetrahydro - 11 - hydroxy-2-(2-morpholinoethyl)pyrazino[1,2 - b] - 1,2 - benzothiazin-1(2H)-one 6,6-dioxide, M.P. 152–153° C.

*Analysis.*—Calcd. for $C_{17}H_{21}N_3O_5S$ (percent): C, 53.81; H, 5.58; N, 11.08. Found (percent): C, 54.14; H, 5.50; N, 10.93.

EXAMPLE IV

2 - (2 - dimethylaminoethyl) - 1,2,3,4 - tetrahydro - 11-hydroxypyrazino[1,2 - b] - 1,2 - benzothiazin - 1(2H)-one 6,6-dioxide To a stirred saturated solution of dimethylamine in 50 ml. of dimethylformamide is added 20.0 g. (0.0515 mole) of (1,2,3,4-tetrahydro-11-hydroxy-1-oxopyrazino-[1,2 - b] - 1,2 - benzothiazin-2-yl)ethyl methanesulfonate 6,6-dioxide and the solution is again saturated with dimethylamine and is heated on a steam bath for 1 hour. After the solvent and excess dimethylamine are removed in vacuo, the residue is dissolved in 1.3 N hydrochloric acid and is precipitated with 10% sodium hydroxide. Upon dissolving the resulting gummy solid in acetone-water, crystallization occurs, yielding the crude product, M.P. 102–105° C. Recrystallization from acetone-water yields the pure product, 2-(2-dimethylaminoethyl)-1,2,3, 4-tetrahydro - 11 - hydroxy - 2 - [(2 - dimethylamino) ethyl]pyrazino[1,2 - b] - 1,2 - benzothiazin - 1(2H)-one 6,6-dioxide, M.P. 105–107° C.

*Analysis.*—Calcd. for $C_{15}H_{19}N_3O_4S$ (percent): C, 53.40; H, 5.68; N, 12.45; S, 9.50. Found (percent): C, 53.47; H, 5.78; N, 12.24; S, 9.68%.

EXAMPLE V 1,2,3,4 - tetrahydro - 11 - hydroxy - 2 - (2 - piperidinoethyl)pyrazino[1,2 - b] - 1,2 - benzothiazin - 1(2H)-one 6,6-dioxide A solution of 6 g. (0.0205 mole) of 2,3,5,6-tetrahydro-13H - oxazolo[2',3':3,4]pyrazino[1,2 - b] - 1,2 - benzothiazin-13(2H)-one 8,8-dioxide and 2.13 g. (0.025 mole) of piperidine in 40 ml. of dimethylformamide is heated on a steam bath for 1.5 hours, after which time the solvent is removed in vacuo. To the residue is added 25 ml. of 10% sodium carbonate solution, and the resulting solid is filtered off, yielding crude product. This crude material is recrystallized from acetone to yield pure product, 1,2,3,4 - tetrahydro - 11 - hydroxy-2-(2-piperidinoethyl)pyrazino[1,2 - b] - 1,2 - benzothiazin-1(2H)-one 6,6-dioxide, M.P. 184–186° C.

*Analysis.*—Calcd. for $C_{18}H_{23}N_3O_4S$ (percent): C, 57.28; H, 6.14; N, 11.13; S, 8.50. Found (percent): C, 57.45; H, 6.18; N, 11.09; S, 8.47.

EXAMPLE VI

The procedure of Example I is repeated except that an equivalent amount each of diethylamine and dipropylamine is used in place of the N-methylpiperizine used therein to yield as respective products:

2-(diethylaminoethyl)-1,2,3,4-tetrahydro-11-hydroxypyrazino[1,2-b]-1,2-benzothiazin-1(2H)-one 6,6-dioxide, and 2-(dipropylaminoethyl)-1,2,3,4-tetrahydro-11-hydroxypyrazino[1,2-b]-1,2-benzothiazin-1(2H)-one 6,6-dioxide.

What is claimed is:

1. A 1,2,3,4 - tetrahydro-11-hydroxypyrazino[1,2-b]-1,2-benzothiazin-1(2H)-one 6,6-dioxide having the formula:

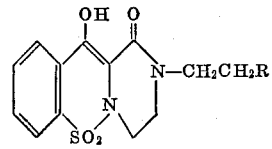

wherein R is a member selected from the group consisting of 4-methylpiperazinyl, anilino, morpholino, diloweralkylamino, and piperidino.

2. 1,2,3,4 - tetrahydro - 11 - hydroxy-2-[2-(4-methyl-1-piperazinyl)ethyl]pyrazino[1,2-b] - 1,2 - benzothiazin-(2H)-one 6,6-dioxide.

3. 1,2,3,4 - tetrahydro - 11 - hydroxy-2-(2-anilinoethyl) pyrazino[1,2-b]-1,2-benzothiazin - 1(2H) - one 6,6-dioxide.

4. 1,2,3,4 - tetrahydro-11-hydroxy-2-(2-morpholinoethyl)pyrazino[1,2-b] - 1,2 - benzothiazin-1(2H)-one 6,6-dioxide.

5. 2 - (2 - diloweralkylaminoethyl) - 1,2,3,4 - tetrahydro-11-hydroxypyrazino[1,2-b]-1,2-benzothiazin - 1(2H)-one 6,6-dioxide.

6. 2 - (2 - dimethylaminoethyl)-1,2,3,4-tetrahydro-11-hydroxypyrazino[1,2-b] - 1,2 - benzothiazin-1(2H)-one 6,6-dioxide.

7. 1,2,3,4 - tetrahydro-11-hydroxy-2-(2-piperidinoethyl)pyrazino[1,2-b] - 1,2 - benzothiazin-1(2H)-one 6,6-dioxide.

References Cited
UNITED STATES PATENTS 3,408,347   10/1968   Shavel et al. _____ 260—243

JOHN M. FORD, Primary Examiner

U.S. Cl. X.R.

117—33.3; 252—300; 260—45.8 SN; 424—246